United States Patent
Bonnet et al.

(10) Patent No.: US 10,482,774 B2
(45) Date of Patent: Nov. 19, 2019

(54) MANAGEMENT OF NOTICES TO AIRMEN

(71) Applicant: THALES, Courbevoie (FR)

(72) Inventors: Antoine-adrien Bonnet, Toulouse (FR); Christophe Lerat, Toulouse (FR)

(73) Assignee: THALES, Courbevoie (FR)

( * ) Notice: Subject to any disclaimer, the term of this patent is extended or adjusted under 35 U.S.C. 154(b) by 20 days.

(21) Appl. No.: 15/849,359

(22) Filed: Dec. 20, 2017

(65) Prior Publication Data
US 2018/0182250 A1    Jun. 28, 2018

(30) Foreign Application Priority Data

Dec. 22, 2016 (FR) ...................................... 16 01838

(51) Int. Cl.
*G08G 5/00* (2006.01)
*G06F 17/27* (2006.01)
*G08G 5/06* (2006.01)

(52) U.S. Cl.
CPC ....... *G08G 5/0039* (2013.01); *G06F 17/2785* (2013.01); *G08G 5/0047* (2013.01); *G08G 5/065* (2013.01)

(58) Field of Classification Search
CPC .. G08G 5/0039; G08G 5/0013; G08G 5/0021; G08G 5/0047; G08G 5/025; G08G 5/065; G08G 5/0086; G06F 17/2785
USPC ......................................................... 701/14
See application file for complete search history.

(56) References Cited

U.S. PATENT DOCUMENTS

| | | | |
|---|---|---|---|
| 8,970,399 B1 | 3/2015 | Zimmer et al. | |
| 2016/0047674 A1* | 2/2016 | Ramaiah | G01C 23/005 340/995.27 |
| 2016/0093219 A1* | 3/2016 | Bailey | G08G 5/0013 701/120 |
| 2016/0093222 A1* | 3/2016 | Hale | G08G 5/0039 701/120 |
| 2016/0209234 A1* | 7/2016 | Passinger | B64D 43/00 |

FOREIGN PATENT DOCUMENTS

| | | |
|---|---|---|
| EP | 2 657 923 A2 | 10/2013 |
| EP | 2 975 362 A1 | 1/2016 |
| EP | 3 051 520 A1 | 8/2016 |
| WO | 2016/113306 A1 | 7/2016 |

* cited by examiner

*Primary Examiner* — Gertrude Arthur Jeanglaude
(74) *Attorney, Agent, or Firm* — Baker & Hostetler LLP (57) ABSTRACT

A description is given of a method, implemented by a computer, for managing a notice to airmen, comprises the steps of: receiving at least one notice to airmen; receiving one or more elements of a navigation database associated with a flight plan of an aircraft; comparing the content of the received notice to airmen with the elements of the navigation database associated with a flight plan of an aircraft. Various developments describe in particular the detection of unavailable elements on the basis of analysis of the content of the messages, processing operations performed on the portion of the messages expressed in natural language, diverse methods of notifying the pilot, the intervention of third-party operators in the management of the messages, the enrichment of data and various implementation variants with regard to the system (flight management system FMS and/or electronic flight bag EFB).

15 Claims, 3 Drawing Sheets

```
LFFA-A5214/16
Q) LFFF/QICCT/ I/NBO/
A/000/999/4901N00233E005
A) LFPG  PARIS CHARLES DE GAULLE
B) 2016 Nov 18  08:36 C) 2016 Dec 21  16:00
E) ILS RUNWAY 08L UNDERGOING
ADJUSTMENT. DO NOT USE POSSIBLE
FALSE INFORMATION
```

MANAGEMENT OF NOTICES TO AIRMEN

CROSS-REFERENCE TO RELATED APPLICATIONS

This application claims priority to foreign French patent application No. FR 1601838, filed on Dec. 22, 2016, the disclosure of which is incorporated by reference in its entirety.

FIELD OF THE INVENTION

The invention relates to the technical field of avionics, and in particular to methods and systems for preparing and planning the flight of an aircraft.

BACKGROUND

Planning and conducting an aircraft flight requires knowledge of particular information in relation to airport facilities, weather and other parameters. For example, planning a flight requires knowledge of the (relatively stable) features of the aeronautical facilities that will be used, such as the position and the dimensions of the runways, or the frequencies of the radio beacons, and the position of the aerial points and paths defined by the control authorities. It is also essential to monitor changes that are temporary or more short-term, for example caused by maintenance operations, the weather or any other one-off event.

All of the necessary information is made available by way of databases, in particular navigation databases (NAVDB), and notices to airmen (NOTAM).

Managing NOTAM messages in existing systems entails limits and disadvantages. In particular, the navigation databases (NAVDB) are not integrated with the flow of NOTAM messages. The two systems are decoupled, i.e. are not integrated.

The pilot has to take note of the NOTAM messages and to take them into account when planning the flight and then executing it, but this is based only on his memory between these steps. He has to manage the NOTAM messages with his memory alone. Although inconsistencies resulting from the lack of integration do not generally pose problems in the nominal case (in which everything runs more or less as expected), a significant and/or emergency revision of the flight plan (for example during a diversion) may lead to the pilot forgetting or ignoring an important message. The consequences of such an oversight (involuntary) or ignorance (active, under pressure) may be catastrophic (e.g. landing on a runway undergoing maintenance). Not taking into account a NOTAM message may have serious consequences, possibly stretching as far as a violation or putting the aircraft in danger. There are therefore issues of aeronautical safety.

There is a need for advanced methods and systems for managing notices to airmen.

SUMMARY OF THE INVENTION

A description is given of a method, implemented by a computer, for managing a notice to airmen, comprising steps consisting in: receiving at least one notice to airmen; receiving one or more elements of a navigation database associated with a flight plan of an aircraft; comparing the content of the received notice to airmen with the elements of the navigation database associated with a flight plan of an aircraft. Various developments describe in particular the detection of unavailable elements on the basis of analysis of the content of the messages, processing operations performed on the portion of the messages expressed in natural language, diverse methods of notifying the pilot, the intervention of third-party operators in the management of the messages, the enrichment of data and various implementation variants with regard to the system (flight management system FMS and/or electronic flight bag EFB).

Advantageously according to the invention, the pilot may no longer have to rely on his spontaneous memory alone (or his written notes) to manage the NOTAM messages. This type of message may nevertheless be taken into account, in a more automated manner, and therefore in a safer and more systematic fashion, improving air safety.

Also advantageously, the pilot may be reminded of the content of relevant messages at the appropriate moment (contextualized information).

Advantageously, the analysis and the processing of the portion of the messages in formal or coded language, performed digitally, enables sorting criteria to be applied (for example by type of threat, by severity, depending on the type of plane, etc.). In some embodiments, this processing of information enables the generation of lists of NOTAM messages that are sorted in order of relevance or of importance (for example, runway closed/very important; taxiway closed/little importance; crane present/very low importance).

Advantageously, the portion of a NOTAM message expressed in the form of natural language may be processed and taken into account for the flight plan or the mission.

BRIEF DESCRIPTION OF THE DRAWINGS

Other features and advantages of the invention will become apparent with the aid of the following description and the figures of the appended drawings, in which.

DETAILED DESCRIPTION

The term "aircraft" denotes a vehicle such as a plane, or a helicopter, or a drone, etc.

The term "NOTAM", or "Notice to Airmen", denotes a type of message intended for airmen.

NOTAM notices are text messages published by the air navigation control authorities or systems, for the purpose of providing information to pilots.

When a flight is being prepared, but also in flight, the pilot has to consult these messages. It is up to the pilot to take note of those regarding the path and the date of his flight, and to adjust his plan if necessary.

NOTAMs contain highly diverse information regarding air navigation (one-off restriction or hazard, unavailability of a radio navigation item of equipment, of a runway, development of airport infrastructures, modification of a ground facility, presence of obstacles, e.g. a crane, or zones undergoing maintenance in the vicinity of an airport). More generally, a NOTAM may provide information relating to any hazard to air navigation. It may also define no-fly zones.

In a more detailed manner, NOTAM messages may deal with various subjects, in particular: organization of airspace, radar communications and installations, facilities and services, instrument landing devices, lighting installations, movement and landing areas, en-route and terminal zone navigation equipment, air traffic procedures, navigation alerts (e.g. airspace restrictions), in-flight monitoring and in-flight weather services, navigation alerts, diverse information regarding availability, condition changes and hazardous conditions, and restrictions.

A description is given of a method, implemented by a computer, for managing a notice to airmen, comprising steps consisting in: receiving at least one notice to airmen; receiving one or more elements of a navigation database associated with a flight plan of an aircraft; comparing the content of the received notice to airmen with the elements of the navigation database associated with a flight plan of an aircraft.

The expression "notice to airmen" denotes a NOTAM message. The content of a message may or may not be relevant for the flight plan under consideration. In one embodiment, a plurality of messages are collected (on the ground and/or in flight, for example as a flow, i.e. continuously). The content of the messages is obtained by decoding the NOTAM (i.e. the structure and the fields of the NOTAM are known) and analysed in numerous ways. Some messages are selected, i.e. sorted beforehand, for example depending on their degree of relevance in relation to the flight plan, which serves as a sorting criterion. There is a comparison of subjects between the content of a message (structured/coded portion and portion expressed in natural language) and the navigation database termed NAVDB (in full or in part), which database is associated with a flight plan. The flight plan may be the current flight plan but also an alternative flight plan of any kind (e.g. revised, potential, stand-by, diversion, etc.).

In one embodiment, the method comprises a step consisting in determining, on the basis of the content of the received message, that an element of the navigation database associated with the flight plan of the aircraft is unavailable.

The presence (binary: absence/presence) of an element of the NAVDB indicated as being (temporarily) unavailable is determined. The content of the messages may be analysed (syntactic/lexical analysis, etc.) so as to identify those that report an unavailable element (e.g. unavailable aeronautical facility), and also so as to produce a list of the facilities in question with unavailability start and end dates.

In one embodiment, the method comprises a step consisting in comparing the content of the message with a database associated with a flight plan of the aircraft, comprising a step consisting in determining the presence of one or more keywords from among a plurality of predefined keywords.

Keywords such as "maintenance", "closed" or "unavailable" may be detected. The presence of keywords may also be cumulative, thereby enabling determination of the occurrence of one scenario from among several ("crossing", "vehicles", "behind", "parking"). In one embodiment, the method comprises a step consisting in grading a NOTAM message depending on criteria established beforehand (for example a score).

In one embodiment, the method comprises a step consisting in associating the content of a message with one flight plan from among a plurality.

The term "associate" may be replaced with the term "correlate": this means that a degree of relevance is determined (for example quantified, or according to a finite scale), for example for each flight plan under consideration (via the associated navigation databases). The content of a given message may not be relevant for a first flight plan, but may prove to be highly important for a second flight plan (for example for a revision of the first flight plan).

The method according to the invention may multiply the comparisons (N messages against M flight plans). One and the same message may be associated with a plurality of flight plans.

In one embodiment, the method comprises a step consisting in carrying out semantic analysis of the content of the message expressed in natural language.

The known structural elements in the NOTAM messages are designed to sort/select the relevant messages beforehand. Among these selected messages, the portions of the messages expressed in natural language may advantageously be analysed, in particular through semantic analysis. Semantic analysis may combine lexical analysis (vocabulary used) and syntactic analysis (grammar) in order for example to determine matches/occurrences of one scenario from among a plurality of predefined scenarios (one and the same scenario may be expressed by various phrases).

In one embodiment, the method comprises a step consisting in notifying the pilot if the presence of an unavailable element has been determined (semi-open loop).

The detection step is generally automated (i.e. closed loop, e.g. performed by automatic comparisons), but it may be achieved by manual analysis on the part of the pilot or of another actor, for example a handler to whom the analyses are provided remotely (semi-open loop). For example, a message whose score would be lower than a predefined threshold may be brought to the attention of the pilot, who is able to deny or confirm the grade or the relevance of the message under consideration.

Such notifications or warnings may arise during the initial planning of the flight, on an EFB or directly on the FMS of the aircraft, or during a modification performed in flight.

In one embodiment, the method comprises a step consisting in receiving confirmation of the element determined as being unavailable. The pilot may close the feedback loop in some cases.

The use of an unavailable element is generally reported, but use thereof is not generally prevented de facto. As the pilot is able to decide to disregard, a new warning may for example be sent in flight, when the plane is approaching the phase in which this element would be used.

In one embodiment, the method comprises a step consisting in tagging the navigation database NAVDB.

In one embodiment, the analyses of the NOTAM messages lead to tagging (addition of data while keeping the original data) of the navigation database NAVDB.

In one embodiment, the NOTAM messages lead to modification (replacement through the addition and deletion of data) of the navigation databases NAVDB.

In one embodiment, the event for triggering a comparison and/or notification step is dependent on the flight context and/or on a revision of the current flight plan of the aircraft.

The flight plan may determine the comparison operations.

In one embodiment, the flight context also triggers some/certain comparisons. The flight context of the aircraft includes in particular the climbing, descent, cruising, take-off, landing etc. phases. The flight context may be used to filter/select the relevant NOTAM messages, i.e. those having to be taken into account for the flight plan of the aircraft (e.g. current, potential, revised).

In one embodiment, a revision of the flight plan triggers some/certain comparisons. The information disclosed by the content of the NOTAM messages may be mobilized on various occasions: a) insertion of an element marked as being unavailable when a flight plan is created or modified;

b) loading of a flight plan stored in memory beforehand by the system, or transferred from another (typically, loading of a flight plan prepared on an EFB onto the FMS), containing this unavailable element; c) insertion of a flight plan portion passing close to an unavailable radio beacon, possibly leading to a loss of positional accuracy. During the flight, arrival in the zone in which this beacon should be used (if it were available) may also be detected.

In one development, the method comprises a step consisting in sending a reminder notification in the event of use of an element, determined as being unavailable, of the navigation database.

In one embodiment, the method comprises a step consisting in collecting a plurality of notices to airmen. The method may then repeat the steps described previously (e.g. steps of comparing the content of said messages with the navigation database elements, notification steps, etc.).

In one embodiment, the content of a message is enriched with non-avionic external data.

In one embodiment, the content of the collected messages may be subjected to processing operations (for example tests (logic tests and/or tests for crossovers with other databases (that are non-avionic, i.e. from the "open world")).

In one embodiment, at least one portion of a notice to airmen is computer-readable. NOTAM messages are at present text data, comprising natural language that is barely or not at all structured from a computing point of view. In one embodiment, the NOTAM messages are computer-readable ("machine-readable").

A description is given of a computer program product, said computer program comprising code instructions configured to perform one or more of the steps of the method when said program is executed on a computer.

A description is given of a system comprising means for implementing one or more of the steps of the method.

In one embodiment, the system comprises an electronic flight bag EFB and/or a flight management system FMS.

Figure 1:
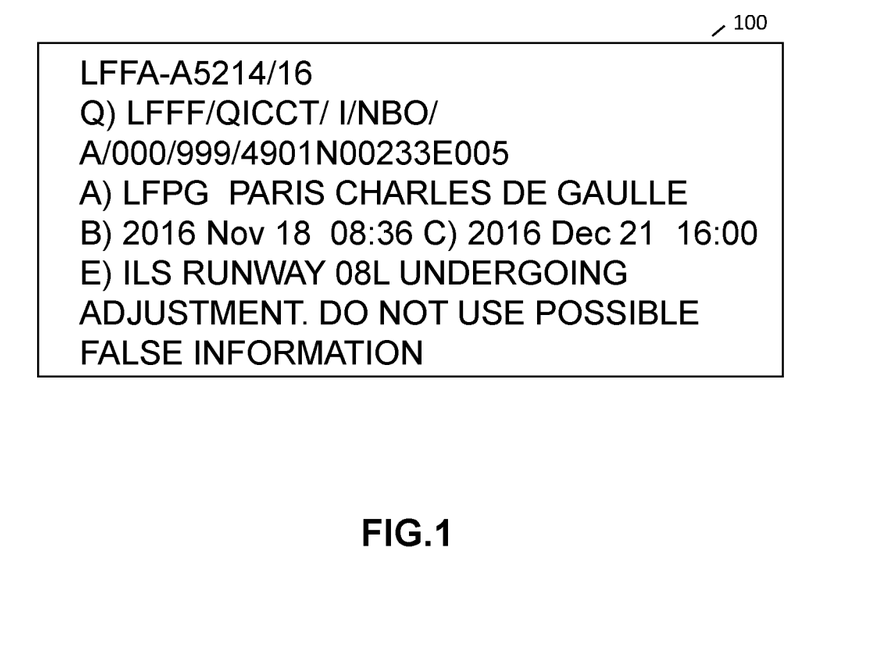
FIG. 1 illustrates an example of a notice to airmen (NOTAM), as manipulated by the invention.

FIG. 1 illustrates an example of a notice to airmen NOTAM 100.

In the example, the first line corresponds to the sender and to the identification number of the NOTAM.

The second line corresponds to the "qualification" of the NOTAM. This field is somewhat illegible to a human, but may prove to be useful from an automatic operation perspective. The code LFFF indicates that the message relates to the FIR ("Flight Information Region") of Paris. The code QICCT indicates that an ILS beacon (IC) should not be used as it is undergoing testing (CT). This field may for example be useful for filtering purposes. The code I relates to the IFR flights. The code N, for NOTAM, is selected to attract the immediate attention of any plane operator. The code B is selected to appear on the PIBs ("Pre-flight Information Bulletins"). The code O indicates that a significant message for the flight operations is involved. The code 000/999 indicates that the altitudes in question range from the ground but do not have an upper limit. The code 4901N00233E005 indicates that the NOTAM applies over a radius of 5 nautical miles around the coordinates 49°01' N, 002°33' E.

The third line indicates the code and name, in plain text, of the airport in question.

The fourth line indicates the validity start and end dates of the NOTAM message. NOTAM messages are specifically generally associated with validity dates (programmed obsolescence, expiry date). NOTAM messages may be broadcast in advance (e.g. NOTAM sent before the start of effective unavailability, if this is able to be forecast).

The fifth line is free text, i.e. in natural language (as opposed to a formal language, i.e. text that is not restricted or structured or formalized). There is an (optional) list of terms and abbreviations to be used for common events, but the nature of the content of this field may be de facto highly variable (stylistic, grammatical, lexical variety, etc.). This field takes up, in the example, the second line in the form of natural language, and supplements it (in this case by indicating the ILS in question).

The example illustrates that (current) NOTAM messages may combine (or juxtapose) text elements expressed in formal language (or in a relatively coded or standardized form, and therefore relatively easy for machines to manipulate) with elements expressed in the form of natural language (which pose specific problems with regard to the automatic processing of the languages, e.g. syntactic analysis, ambiguities).

With regard to aeronautical information (in the broad sense), a certain number of text sources may be manipulated by the method according to the invention.

For example, in the future, developments of current NOTAM messages (NOTAM termed ICAO), called "DIGITAL NOTAM" or "D-NOTAM", should formalize the content to an even greater extent. Some approaches propose for example including electronic links from the D-NOTAM messages to external databases and/or to structure the D-NOTAMs according to an events-based approach. These developments point in the direction of increasing coding, but elements in natural language should continue to be used.

The "draft" specification of the last specification dates from 2014. A Digital NOTAM is at present an extension based on AIXM 5.1 in XML (extensible mark-up language, generic mark-up computing metalanguage). A Digital NOTAM comprises "Event" information that contains one or more "NOTAM" subjects generated following this event, and various fields indicating any temporary or permanent modifications to the static data. A "NOTAM" subject contained in the Digital NOTAM itself contains the conventional NOTAM ("ICAO"). A Digital NOTAM therefore does not comprise significantly more information than before, i.e. than the ICAO NOTAM originating from the AFTN. In any case, it remains necessary to analyse the text of the NOTAM subject in order to evaluate operational impact.

Moreover, information sources such as "AIP-SUPs" also comprise potentially relevant information (i.e. that may have an impact on the flight plan). In France, the list of TCZs (temporary control zones) is published in a document called "Complement aux cartes aéronautique" ("Aeronautical supplement to maps"), issued by the SIA (French aeronautical information service), and activation thereof, for its part, is published in the form of AIP SUPs. An AIP SUP may outline facts and conditions regarding location, validity, subject, activity (e.g. protection, putting into service), dates and times of activity, conditions (e.g. of entry, of overriding). Advantageously, the NOTAM or AIP-SUP messages originate from sources that are authenticated and/or whose integrity is checked or able to be checked.

In some embodiments, in an even more general manner, even if it is not nominal, i.e. with an importance that may be anecdotal at times, the information originating from the "open world", i.e. looked up on and extracted from the Internet, may be accessed and analysed by the method according to the invention (provided that there are for example checks on the authenticity and/or integrity of these third-party data). For example, it is possible to take into account documentary sources providing updates on the risk of attacks or on specific threats (e.g. the presence of laser pens, drones, unusual volcanic activity, etc.), providing notifications about the presence of migratory birds in the vicinity of airports, aeronautical displays (e.g. hot air balloons), various incidents, etc. The probability of an event occurring may be extremely small, but its severity may be exceptional: these embodiments of the invention may be advantageous.

In other words, a text message manipulated by the invention comprises natural language (legible to humans, with greater difficulty to machines) and/or coded elements (legible to humans and also to machines).

Therefore, in a general manner, although they are able to be "decoded", the text messages currently sent and manipulated in existing systems are data expressed in natural language, i.e. "non-structured" (or loosely structured) from a computing point of view.

In an even more general manner, messages comprising elements in the form of images and/or videos (e.g. AIP SUPs) may also be manipulated by the invention. Examples of processing operations are described later on.

In one embodiment, the messages manipulated by the invention are messages able to be manipulated by a computer (i.e. messages formatted or structured in such a way as to be able to be processed by a computer, e.g. "machine-readable", for example in XML). Advantageously, rendering or viewing of these data enables both understanding by humans but also, and above all, processing operations to be performed by a machine, which is thus able to perform comparisons, perform symbolic processing operations and conversions, and thus detect errors and/or mismatches and/or inconsistencies in the data of the NOTAM messages, but also with consideration to external data (e.g. weather, ATC instructions, etc.).

It is important to note that although, in the general case, the messages (for example NOTAMs) may be independent, in some cases a first NOTAM message may modify (e.g. specify, render obsolete, supersede, partly or fully invalidate) one or more other (past or sometimes future) NOTAM messages. For example, a message indicating a zone undergoing maintenance at an airport may be modified by a second subsequent message indicating the closure of this airport.

Figure 2:
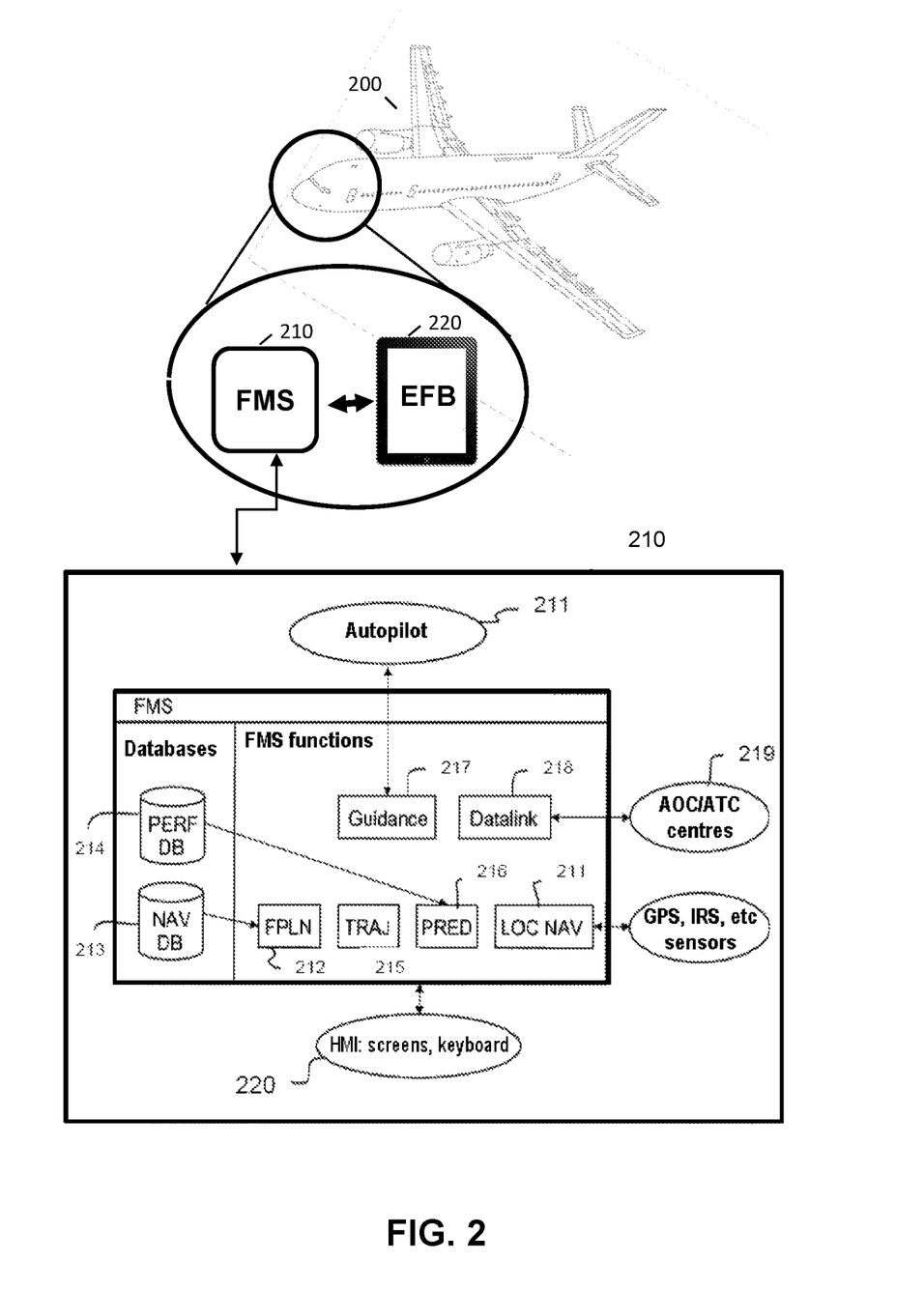
FIG. 2 schematically illustrates the structure and the functions of a flight management system of known FMS type and of an electronic flight bag EFB.

FIG. 2 schematically illustrates the structure and the functions of a flight management system of known FMS type and of an electronic flight bag EFB.

FIG. 2 shows an aircraft 200, the cockpit of which comprises an avionic flight management system FMS 210 and, sometimes, a non-avionic (not certified, "open world") electronic flight bag EFB 220.

The steps of the method according to the invention may be implemented by various items of hardware, in particular by one or more of these FMSs and/or one or more of these EFBs. Other avionic systems (not shown) may also manage (receive, process) NOTAM messages. These avionic systems (i.e. certified or regulated systems) in particular comprise avionic EFBs or AOC printers.

In one embodiment, all of the steps may be performed by or on an EFB. In practice, an EFB comprises functionalities that are well suited to manipulating NOTAM messages. In other embodiments, some steps may be carried out in part in an EFB, whereas the rest of the steps may be carried out by the FMS. In some embodiments, some steps may also be carried out jointly or concurrently by the FMS and the EFB.

Each type of system is first of all described individually, and then some interactions between these two types of system are described.

The term FMS 210 denotes a flight management system (standard ARINC 702), that is to say an avionic system (certified, regulated). During the preparation of a flight or upon a diversion, the crew inputs various information relating to the progress of the flight, typically by using this management device. An FMS generally comprises input means and display means, as well as computing means. An operator, for example the pilot or the co-pilot, is able to input, via the input means, information such as constraints (e.g. overfly, altitude, etc.) that are associated with known waypoints, that is to say points on the vertical through which the aircraft has to pass. The computing means associated with the FMS are in particular configured to compute, on the basis of the flight plan comprising the list of waypoints, the trajectory of the aircraft, depending on the geometry between the waypoints, the associated constraints and/or the altitude and velocity conditions, and also the crossing times and the remaining fuel at each point.

An FMS system 210 is generally positioned in a cockpit, and has a human-machine interface comprising input means that are for example formed by a keyboard, and display means that are for example formed by a display screen, or else simply a tactile display screen, and at least the following functions: a) Navigation (LOCNAV) 211, for performing optimal positioning of the aircraft depending on geopositioning means, such as satellite geopositioning or GPS, GALILEO, VHF radio navigation beacons and inertial units. This module communicates with the aforementioned geopositioning devices; b) Flight plan (FPLN) 212, for inputting geographical elements forming the "skeleton" of the route to be followed, such as the points imposed by the departure and arrival procedures, the waypoints, and the air corridors, commonly called "airways". The methods and systems described impact or relate to this portion of the computer; c) Navigation database (NAVDB) 213, for constructing geographical routes and procedures on the basis of data included in the bases relating to the points, beacons, intercept or altitude legs, etc.; d) Performance database (PERFDB) 214, containing the aerodynamic and engine parameters of the airplane; e) Lateral trajectory (TRAJ) 215, for constructing a continuous trajectory on the basis of the points of the flight plan, complying with the performance of the aircraft and the confinement constraints (RNP); f) Predictions (PRED) 216, for constructing an optimized vertical profile on the lateral and vertical trajectory and giving estimations of distance, time, altitude, velocity, fuel and wind in particular at each point, upon each change of piloting parameter and at the destination, which estimations will be displayed to the crew; g) Guidance (GUID) 217, for guiding the aircraft on its three-dimensional trajectory in the lateral and vertical planes, while optimizing its velocity, using information computed by the Predictions function 216. In an aircraft equipped with an autopilot device 210, the latter may exchange information with the guidance module 207; h) Digital data link (DATALINK) 218 for exchanging flight information between the Flight plan/Predictions functions and the control centres or other aircraft 219; i) one or more screens, in particular what are termed MFD, ND and VD screens.

An EFB 220 denotes on-board electronic libraries. An EFB, or electronic flight bag, is a portable or fixed (i.e. inserted into the cockpit of the aircraft) electronic appliance used by the navigating personnel (for example pilots, maintenance staff, cabin crew, etc.). An EFB may supply flight information to the crew, assisting them in performing tasks (with less paper). In practice, it generally involves an off-the-shelf tablet computer. One or more applications are designed to manage the information for flight management tasks. These general-purpose computing platforms are intended to reduce or replace the reference material in paper form, often found in the hand luggage of the "Pilot Flight Bag", and the handling of which may be cumbersome. The reference paper documentation generally comprises the piloting manuals, the various navigation maps and the ground operation manuals. This documentation is advantageously dematerialized in an EFB. Furthermore, an EFB may host software applications specially designed to automate operations normally carried out manually, such as, for example, take-off performance computations (computation of limit velocity, etc.).

The EFB and FMS systems may interact. The interaction is at present asymmetric: the avionic core FMS is certified, thereby generally preventing or limiting the direct electronic injection of data from the outside into the FMS (the inputs are manual and performed by the pilot); this configuration is nevertheless liable to change. On the other hand, the (digital) data at the output of the FMS constitute input data for an EFB that is able to perform numerous computations (checks, simulations, etc.). The FMS function is increasingly able to be emulated, i.e. the code of the FMS is able to be carried and executed in or by the EFB, thereby enabling a more extensive "integration". Indeed, an EFB is currently able to carry out almost all of the tasks able to be envisaged for a flight or a mission (performance computation, flight plan computation, determination of alerts, computation of alternative routes, etc.). Using the same algorithms as the certified avionic core, an EFB is able natively to construct flight plans acceptable to the certified avionic core. With computing capabilities that may be broader and possibly amplified even more by the option to use external or remote computing resources ("cloud", multi-core processors, etc.), the periphery of the avionic core is playing an increasing role.

The messages are therefore advantageously able to be processed and analysed exclusively on an EFB, which is able to deploy a very wide array of technology, in particular for automatic language processing or for image analysis (see the following list of information processing operations).

In one embodiment, the FMS is able to perform some of the steps of the method by collecting these NOTAM messages through the channel termed AOC. In one variant, the EFB collects the messages through its own channel (e.g. secure Internet access) and sends, to the pilot and optionally to the FMS, an alert regarding the (only) points of the flight plan using a resource made unavailable through analysis of the content of a NOTAM message.

In one embodiment, an EFB system may obtain one or more NOTAM messages through an Internet connection (FMS systems increasingly have a satellite data link that is also able to be used, in addition or as a substitution).

When the planning of the flight is performed using an on-board system (FMS) and/or EFB, all of this information may be stored in a navigation database (NavDB).

Beyond EFB/FMS exchanges, third-party systems may intervene. In some cases, an external handler may provide, for example remotely, the users (such as airlines) with the content of the navigation database NavDB. The handler, by way of a server, for example computerizes this content on the basis of official aeronautical information publications (AIPs), guarantees the integrity thereof with respect to these sources, and updates them regularly. With regard to updating the data, the database update frequency may vary. Some are regular but infrequent (28-day AIRAC cycles). These updates are well suited to long-term modifications, such as commissioning, withdrawal, or a major modification of an airport facility. Other data are updated much more quickly and are accessible in real time (e.g. weather data).

In one embodiment, the processing operations performed on the messages may be carried out directly by the on-board FMS system and/or the EFB that is used. In one embodiment, the processing operations performed on the messages may be carried out in a centralized manner by a body or an entity supplying the NOTAMs in decoded form in addition to their unprocessed form (the latter option being designed to check and to complete automated decoding through human intervention).

In one embodiment, the NOTAM messages are received, collected and processed by an EFB. Specifically, if a pilot has an EFB, this enables him to automatically recover all of the NOTAMs linked to the flight plan currently being defined on the airplane (that is to say by filtering those that relate to the departure and arrival airports and those that are situated along the trajectory, and those that relate to flight information regions that are passed through). This function may, in addition or as a substitution, be provided by an FMS equipped with a data link.

In one embodiment, the FMS manipulates a revised flight plan and supplies a list of flight plan points, which are, for their part, manipulated by the EFB, which checks the information against the NOTAM messages. In other words, in this interaction framework, the FMS is designed to form the breadcrumbs trail of the combinatorial exploration (the outputs of the FMS are used to sort what will be manipulated in the EFB).

In some situations, the FMS may establish blacklists (for example of radio beacons or of GPS satellites), depending on received NOTAMs, which the pilot is able to confirm by way of the EFB.

Figure 3:
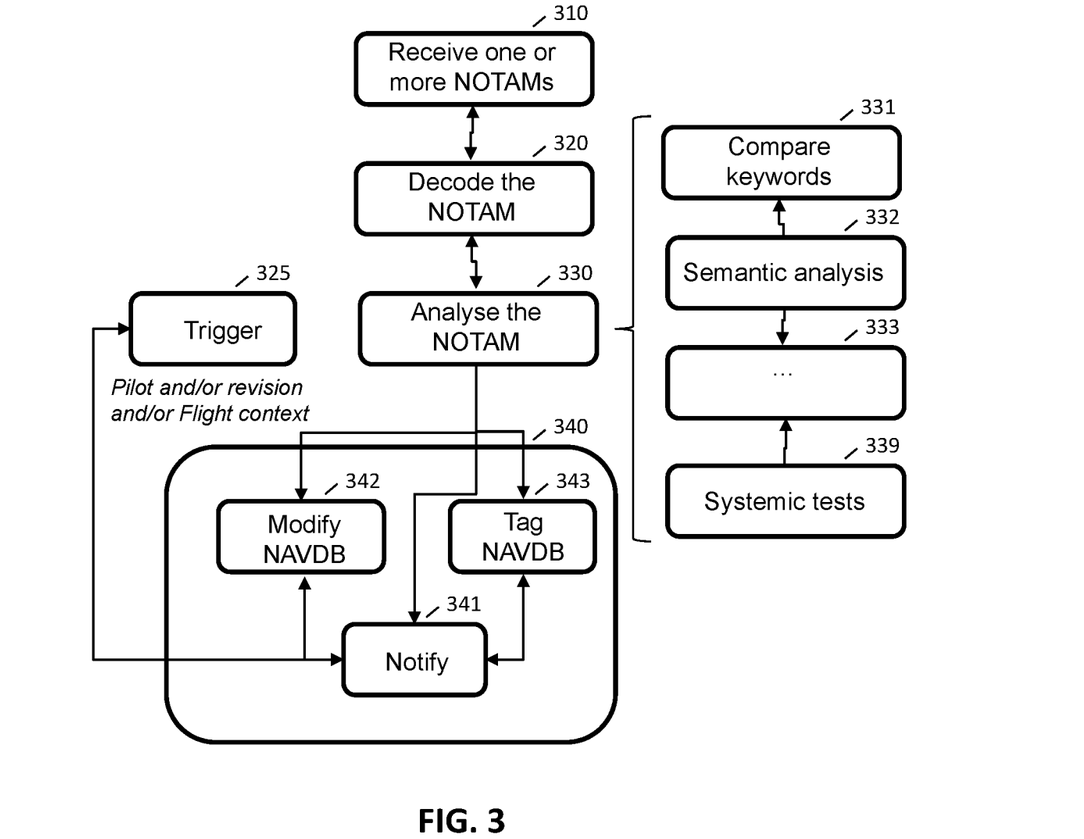
FIG. 3 illustrates examples of steps of the method according to the invention.

FIG. 3 illustrates examples of steps of the method according to the invention.

In step 310, (at least) one NOTAM message is received via the Internet in an EFB and/or by a SATCOM network in the FMS. The NOTAM messages are collected and are stored locally and/or remotely.

In step 320, one NOTAM message from among the plurality is "decoded". If it contains natural language, the method comprises for example steps of extraction, classification, extraction of keywords. If the message is computer-readable, the content may be assimilated in a specific database.

After the decoding step 320, the method comprises a step 330 consisting in analysing one NOTAM (from among a plurality). Various attributes of this message (portions of content, properties or logical conclusions, etc.) are then determined.

In one embodiment, the analysis method comprises a step consisting in determining (e.g. detecting or computing) a state of unavailability of a facility or of another element, as reported by the content of the message. This determination may in particular be performed depending on the flight plan (e.g. current or potential, i.e. revised).

In one embodiment, the method determines a list of unavailable elements (and the dates associated with these reports). In other words, the method may comprise a step consisting in accumulating or storing or assimilating (e.g. sorting, processing, deduplicating, merging, checking) the unavailability information.

In one embodiment, the unavailability (manipulated information) is binary (binary state yes/available; no/unavailable).

Some embodiments of the invention manipulate states that are quantified or discretized into a finite number of values or states. In some embodiments, the unavailabilities are graduated or weighted or modulated (or quantified or probabilistic, i.e. "risk of unavailability"). In some embodiments of the invention, risks or probabilities are manipulated. In some embodiments, targeted alerts may be manipulated (for example an item of information indicating a shortened runway), i.e. information not relating to an unavailability in the strict sense, but that modulates or specifies elements of information that are significant for the flight plan or the mission (for example diversion to an airport comprising this shortened runway).

The analysis step 330 comprises one or more processing steps (the steps described hereinafter may be combined). Various techniques for analysing text, images and/or videos may be implemented sequentially or in parallel (e.g. concurrently).

In one embodiment, the method comprises a step 331 consisting in detecting one or more keywords from among a plurality of predefined keywords. For example, the word "maintenance" will be detected in the flow of collected NOTAM messages.

In one embodiment, the analysis step may comprise a step consisting in comparing these keywords with predefined keywords.

In one embodiment, the method comprises a semantic analysis step 332, this semantic analysis consisting in particular in making a NOTAM message correspond to one scenario from among a plurality of predefined scenarios. In one embodiment, the semantic analysis may be carried out taking consideration of the accumulation of keywords and/or their synonyms, which may be indicative of the implementation of a scenario established beforehand. Scoring methods may be used.

In one embodiment, the analysis step comprises a step consisting in collecting a plurality of messages and then in performing supervised learning on the collected messages, for example for automatic classification purposes.

In one embodiment, the learning is unsupervised.

In one embodiment, the analysis step comprises one or more "deep learning" steps. Deep learning denotes data modelling methods in particular using neural networks.

In one embodiment, the analysis step comprises one or more steps associated with "big data" techniques, the term denoting specific techniques suited to processing very high-volume data (i.e. capture, storage, looking up, sharing, analysis and viewing of the data). For example, data mining ("text mining"), indexing or viewing techniques (not exhaustive) may be implemented. In this case, statistics may be compiled regarding the unavailabilities observed over long periods, with a fine spatial and temporal resolution, correlations may be determined between various flight parameters, etc.

In one embodiment, the analysis step comprises a tagging step, performed by the pilot or other operators. These third-party operators comprise in particular the air traffic control (ATC) authorities and/or air operations centres (AOCs). The pilot is able to save a message (or a message extract, in particular) to his favourites, share his bookmarks, etc.

In one embodiment, with a first message being able to modify a second message, the method comprises a step consisting in "assimilating" (or merging or unifying) messages (for example NOTAMs) in a specific database. This assimilation or unification may be performed in various ways. An item of data in a first message may be updated, i.e. replaced, with the item of data in a second message (management of events, i.e. factual data, as disclosed by the NOTAM messages). At a higher abstraction level, the content of a message may correspond to a logic rule, which rule is able to modify the subsequent and/or past messages. The messages are therefore able to be analysed by managing the events and/or the rules that are derived from the content of the various messages.

In one embodiment, the assimilation (of a NOTAM in the consolidated or merged database) is conditional. Taking an erroneous NOTAM into account may have systemic effects, i.e. knock-on effects. This involves conditionally assimilating each NOTAM received after machine and/or human loop tests.

In one embodiment, a set of alternative flight plans may be determined in a combinatorial manner, and then the intersections with the set of messages (in particular NOTAMs) may be determined, i.e. the opportunities (advantages) or the impossibilities or disadvantages associated with each of the potential flight plans, which plans may be sorted or ranked or graded (and then possibly presented to the pilot). In one embodiment, these evaluations may be conducted continuously in the background, and may for example use the unused computing capacities of the EFB and/or of the FMS.

With a given message being able to modify past and/or future messages, decision trees or "systemic" analyses may be determined. For example, a precise choice of navigation may lead to situations that are radically different, some of which are highly unfavourable (accrued risks, increase of fuel consumption, dwindling of subsequent flight options, etc.). Suitable analyses or simulations may disclose the criticality associated with this choice, analyses or simulations being based in particular on the information extracted from the notices to airmen.

In one embodiment, managing the logic rules extracted from the messages may lead to "systemic" risks being detected and therefore managed (an event or a rule may have knock-on effects on the flight plan).

In one embodiment, images present in messages may be analysed, and meaning may be extracted from visual content. For example, OCR (optical character recognition) processing operations may be implemented so as to transform a map originating from an AIP-SUP document into elements able to be manipulated by the method according to the invention. By extension, information may be extracted from video content (sequences of fixed images). Pattern recognition steps may add information for making decisions.

In one embodiment, in addition or as a complement to analysis steps carried out by computers, human analyses may be injected into the message analysis and consideration method: the notices to airmen may in particular be checked and/or tagged and/or reworded and/or validated and/or authenticated and/or "guaranteed" beforehand by various operators and/or organizations. Technically, these steps may be carried out remotely.

The messages are analysed systematically (they are at least sorted).

The notification step 341 may be triggered 325 in various ways. This notification may be carried out continuously over time (e.g. periodically, intermittently, regularly in time), or on request (e.g. by the pilot or a third-party operator), or even depending on the flight plan and/or on the flight context (in the take-off, climbing, cruising, landing, taxing etc. phases).

After notification, as the case may be (in a semi-open loop, i.e. with control by the pilot), the navigation database NAVDB may be tagged (or modified).

With regard to the flight plan, it is in particular possible to establish matches or a correlation between the validity dates of the various received NOTAM messages and the forecast progress of the flight (for example if a given landing runway is available at a given time, but will no longer be available at the plane's arrival time). The comparisons may be performed in both directions: the flight plan may provide criteria used to sort the messages, and, vice versa, the content of the messages may result in reconsideration of the progress of the flight or some of its alternatives.

As the flight plan progresses, some elements present in the flight plan may be filtered and/or be used to trigger detection or coherence tests. For example, a flight plan revision performed by the pilot may lead to an alternative airport being considered. The NOTAM messages relating to this airport will then be selected and then analysed. These messages may also be analysed beforehand so as to anticipate the various options offered to the pilot and indicate to him that an area that is normally favourable for a diversion is not an option due to a NOTAM.

In some embodiments, triggers (e.g. events, times, flight phases, etc.) are not necessary. For example, the zones that are potentially able to be used during a diversion (which zones may be a great distance away) may be used as criteria for analysing the messages relating to these zones. The volume of messages may be very high, well beyond what is able to be managed by the pilot, on account of the combinatorics of potential trajectories. On the architectural plane, this anticipatory function may be performed by an application executed on an EFB (a connected EFB application may be performed on board and/or on the ground).

Various steps 340 are possible after one or more NOTAM messages have been analysed.

In one embodiment, the navigation database NavDB is modified 342 directly, i.e. the original data from the NavDB are modified depending on the analyses carried out on the content of the messages. This direct modification of the data may be accompanied by a backup or recovery copy of the data if necessary.

In one embodiment, given that it may be necessary to guarantee the integrity of the navigation database NavDB, the navigation database NavDB is kept in its current state and annotations or tags or metadata are associated 343 with the navigation database NavDB (which as such remains unaffected). An 'overlay' of data is thus created (base of associated data, etc.).

In step 341, various methods of feeding back information or notifications are possible.

In general, any call to an element reported as being unavailable by a NOTAM is notified 341 (or relayed) to the pilot using different methods (visual and/or acoustic and/or haptic, etc.). In terms of feedback to the pilot, the pilot is a minima notified 341 of an unavailability relating to his current or revised or potential flight plan. For example, if there is ongoing maintenance work at the selected airport, the pilot is informed or warned thereof. Such warnings enable the pilot to acknowledge his mistake and to correct it quickly.

In one embodiment, the method comprises a step consisting in notifying the pilot, during the flight, of a loss of positional accuracy of the aircraft when it enters a zone in which a navigation beacon that is normally used is unavailable. This may in particular concern arrival and approach procedures.

In one embodiment, the method comprises a step consisting in establishing the list of unavailable navigation elements (radio beacons, GPS satellites, etc.). Advantageously, automatically establishing this list enables the requirement for a manual input to be avoided.

In one embodiment, the method comprises a step consisting in highlighting one or more unavailable elements when the database NavDB is consulted, in particular during the display, on an ND (Navigation Display), of the elements of the NavDB in the vicinity of the aircraft.

In the general case, the method according to the invention does not prohibit and does not hide actions associated with unavailable elements. As the commander, the pilot is still able to consciously disregard a restriction if he deems this necessary. However, in some cases, it is possible to modify 342 (or tag 343, i.e. to add contextual data) the content of the NavDB (the integrity of which has to be guaranteed). In other words, analysing the NOTAMs upstream may result in modifications to data destined exclusively for a machine (i.e. without sensory feedback to the pilot). For example, in some embodiments, it may be made impossible to select an alternative airport having an unavailability as conferred by a NOTAM (e.g. sorting upstream of the request from the pilot). So as to maintain legibility of the information system, this type of assistance may nevertheless be 'disconnectable' (on request by the pilot, the proactive automatic decisions are stopped).

In one embodiment, the NOTAM messages are indexed and are searchable (for example by the pilot). These search criteria may define the search space (for example those relating to only those airports that are able to be reached with the fuel on board).

In one embodiment, beyond the sensory relaying of information to the pilot, the method may comprise one or more steps aimed at determining and then at managing the conflicts brought about by one or more unavailabilities indicated by the NOTAM messages. Some options regarding the flight plan may be made impossible (non-flyable) due to information contained in the messages. In other cases, for lack of impossibilities, there may be resultant losses of accuracy or local degradations. Alternative flight plans may be determined systematically, for example in the background, and be able to be mobilized if necessary. For example, if the aircraft's approach systems go down and at the same time the weather conditions happen to be extremely poor, the method may have determined alternative flight plans in the background, taking into account the NOTAM messages that are collected and analysed regularly. A breadcrumbs trail or guide for managing the combinatorics of possibilities lies in particular in the flight plan and its variants (the flight plan points enable sorting operations or selections to be performed in the data that have to be manipulated).

Some aspects relating to the embodiments of the invention are described hereinafter.

The present invention may be implemented on the basis of hardware and/or software elements. It may be available as a computer program product on a computer-readable medium. The medium may be electronic, magnetic, optical or electromagnetic.

The computing means or resources may be centralized and/or distributed ("cloud computing"), possibly with or using peer-to-peer and/or virtualization and/or redundancy technologies. The software code may be executed on any suitable processor (for example a microprocessor) or processor core or set of processors, whether these are provided in a single computing device or distributed between several computing devices. The computing implementation of the invention may use centralized systems (e.g. client-server or master-slave) and/or distributed systems (e.g. peer-to-peer architecture using accessible computing resources, possibly opportunistically, e.g. ad-hoc networks, etc.).

The system (or its variants) implementing one or more of the steps of the method may use one or more dedicated electronic circuits or a general-purpose circuit. The method may also be implemented on a reprogrammable computing machine (a processor or a microcontroller for example) executing a program comprising a sequence of instructions, or on a dedicated computing machine (for example a set of logic gates such as an FPGA or an ASIC, or any other hardware module). A dedicated circuit may in particular speed up performance, for example in terms of access to the logbook. By way of example of hardware architecture suitable for implementing the invention, a device may include a communication bus to which a central processing unit or microprocessor (CPU) are connected, which processor may be "multicore" or "manycore"; a read-only memory (ROM) being able to contain the programs necessary for implementing the invention; a random access memory (RAM) or cache memory containing registers suitable for recording variables and parameters that are created and modified during the execution of the aforementioned programs; and an I/O ("input/output") or communication interface suitable for transmitting and for receiving data.

In the case where the invention is implanted in a reprogrammable computing machine, the corresponding program (that is to say the sequence of instructions) may be stored in or on a storage medium that is removable (for example a flash memory, an SD card, a mass storage means, such as a hard disk, e.g. an SSD) or that is non-removable, that is volatile or non-volatile, this storage medium being readable in part or in full by a computer or a processor.

The reference to a computer program that, when it is executed, performs any one of the previously described functions is not limited to an application program being executed on a single host computer. On the contrary, the terms computer program and software are used here in a general sense to refer to any type of computer code (for example application software, firmware, microcode, or any other form of computer instruction) that may be used to program one or more processors so as to implement steps of the method.

The invention claimed is:

1. A method, implemented by a computer, for managing a notice to airmen, comprising steps of:
   receiving at least one notice to airmen message with a computer;
   receiving one or more elements of a navigation database associated with a flight plan of an aircraft with the computer;
   comparing with the computer a content of the received notice to airmen message with the one or more elements of the navigation database associated with the flight plan of the aircraft; and
   carrying out semantic analysis with the computer of the content of the received notice to airmen message expressed in natural language.

2. The method according to claim 1, comprising a step of determining, on a basis of the content of the received notice to airmen message, that an element of the navigation database associated with the flight plan of the aircraft is unavailable.

3. The method according to claim 1, comprising a step of comparing the content of the received notice to airmen message with a database associated with a flight plan of the aircraft, and further comprising a step of determining a presence of one or more keywords from among a plurality of predefined keywords.

4. The method according to claim 1, comprising a step of associating the content of a notice to airmen message with one flight plan from among a plurality.

5. The method according to claim 1, comprising the step of notifying a pilot if a presence of an unavailable element has been determined.

6. The method according to claim 5, comprising the step of receiving confirmation of the element determined as being unavailable.

7. The method according to claim 1, comprising a step of tagging the navigation database.

8. The method according to claim 1, wherein an event for triggering a comparison and/or a notification step being dependent on a flight context and/or on a revision of a current flight plan of the aircraft.

9. The method according to claim 8, comprising a step of sending a reminder notification in an event of use of an element, determined as being unavailable, of the navigation database.

10. The method according to claim 1, comprising a step of collecting a plurality of notices to airmen.

11. The method according to claim 1, wherein the content of a message being enriched with non-avionic external data.

12. A computer program product, said computer program product comprising non-transitory code instructions configured to perform the steps of the method according to claim 1 when the non-transitory code instructions of said computer program product are executed on a computer.

13. A system comprising means for implementing the steps of the method according to claim 1.

14. The system according to claim 13, comprising an electronic flight bag (EFB) and/or a flight management system (FMS).

15. The method according to claim 1, wherein the computer comprises at least one of the following: an electronic flight bag (EFB) or a flight management system (FMS).

* * * * *